United States Patent [19]

Kawashima et al.

[11] Patent Number: 5,624,338
[45] Date of Patent: Apr. 29, 1997

[54] DOUBLE V-RIBBED BELT

[75] Inventors: Masahiko Kawashima; Koji Kitahama, both of Hyogo, Japan

[73] Assignee: Mitsuboshi Belting Ltd., Kobe, Japan

[21] Appl. No.: 508,161

[22] Filed: Jul. 27, 1995

[30] Foreign Application Priority Data

Jul. 27, 1994 [JP] Japan .................. 6-196012

[51] Int. Cl.⁶ .................................................. F16G 5/06
[52] U.S. Cl. .................................................. 474/263
[58] Field of Search .......................... 474/238, 240, 474/252, 260, 261, 263

[56] References Cited

U.S. PATENT DOCUMENTS

| | | |
|---|---|---|
| 2,728,239 | 12/1955 | Adams, Jr. . |
| 4,296,640 | 10/1981 | Nosaka . |
| 4,555,241 | 11/1985 | Takano et al. ............... 474/261 |
| 4,708,702 | 11/1987 | Robecchi et al. ............ 474/261 |
| 4,773,895 | 9/1988 | Takami et al. ............... 474/238 |
| 4,781,664 | 11/1988 | Imamura .................. 474/252 X |
| 4,798,566 | 1/1989 | Sedlacek ...................... 474/238 |
| 4,904,232 | 2/1990 | Kitahama et al. ........... 474/238 |
| 4,990,125 | 2/1991 | Stuemky et al. ............. 474/261 |
| 5,120,281 | 6/1992 | Mishima et al. ............. 474/263 |
| 5,161,677 | 11/1992 | Beecher .................. 474/263 X |
| 5,197,928 | 3/1993 | Mishima et al. ............. 474/263 |
| 5,230,668 | 7/1993 | Kawashima et al. ........ 474/263 |
| 5,415,594 | 5/1995 | Kitahama et al. ........... 474/263 |

FOREIGN PATENT DOCUMENTS

| | | |
|---|---|---|
| 0109990 | 6/1984 | European Pat. Off. . |
| 0249404 | 12/1987 | European Pat. Off. . |
| 0514002 | 11/1992 | European Pat. Off. . |

OTHER PUBLICATIONS

PCT International Publication No. WO92/22757, Dec. 23, 1992.

*Primary Examiner*—Roger J. Schoeppel
*Attorney, Agent, or Firm*—Wood, Phillips, VanSanten, Clark & Mortimer

[57] ABSTRACT

A double V-ribbed belt having a body with an inside, an outside, a length, and laterally spaced sides. At least a first rib is exposed on the inside of the body and extends in a lengthwise direction. At least a second rib is exposed on the outside of the body and extends in a lengthwise direction. A substantially inextensible layer resides between the first and second ribs. Laterally extending reinforcing fibers are provided in the body on at least one of the inside and outside of the inextensible layer, with the concentration of reinforcing fibers on the inside of the inextensible layer being different than the concentration of reinforcing fibers on the outside of the inextensible layer.

36 Claims, 2 Drawing Sheets

DOUBLE V-RIBBED BELT

BACKGROUND OF THE INVENTION

1. Field of the Invention

This invention relates to V-ribbed power transmission belts and, more particularly, to a V-ribbed belt having multiple ribs exposed on each of the opposite sides thereof to allow the belt to drive/be driven on both sides.

2. Background Art

V-belts are commonly used in the automotive environment. In a single engine compartment, multiple belts may each be coupled to a plurality of components. For example, one belt can be trained around pulleys on the crank shaft, an alternator, and a fan. Another belt can be trained around pulleys on the crank shaft and a power steering unit. Still another belt can be trained around the crank shaft and a cooler, or the like.

Recently, automotive designers have striven to maximize the useable passenger space in the automobile, reduce its weight, and minimize fuel consumption. Much effort has been concentrated on reducing the size of the engine.

One conventional belt construction, used in the automotive environment, has V-shaped ribs extending in a lengthwise direction of the belt, which ribs are disposed on the inside of an adhesive rubber layer in which load carrying cords are embedded. The outside of the adhesive rubber layer is covered with one or more layers of rubber impregnated canvas.

This type of belt is commonly assembled in a serpentine path on an engine so that both the inside and outside surfaces effect driving of various engine components. As such, the belt is required to be highly flexible, to bend at relatively sharp angles, and run smoothly in this bent configuration.

In one exemplary system, as shown in FIG. 2 herein, a V-ribbed belt 10 is trained around a drive pulley 12 and follower pulleys 14, 16, 18, each of which is carried by a shaft on a separate engine component so that the inside surface 20 of the belt 10 operatively engages each of the pulleys 12, 14, 16, 18. The outside surface 22 of the belt 10 operatively engages an idler pulley 24, through which tension on the belt 10 can be adjusted, and another follower pulley 26, operatively engaged with another engine component.

The outer surface 28 of the pulley 26 and the outside surface 22 of the belt 10 are both flat. These engaging flat surfaces 22, 28 do not have the capability to transmit as large a force as can be accomplished with V-shaped engagement surfaces as those on the inside surface 20 of the belt 10 and the pulleys 12, 14, 16, 18. That is, there is no wedge effect realized from the engagement of the surfaces 22, 28. As a result, there may be excessive wear on the outside surface 22, as well as on the inside surface 20 of the belt 10, with the result being that the belt 10 slips, particularly when the tension thereon has been reduced. This condition makes the belt 10 ineffective in transmitting power in a heavily loaded system.

To overcome the above problem, it is known to utilize a double V-ribbed belt, as shown at 30 in FIG. 1. The belt 30 has a first plurality of laterally spaced, longitudinally extending, V-shaped ribs 32 exposed on one side thereof, and a second plurality of laterally spaced, longitudinally extending, V-shaped ribs 34 on the other side thereof. The ribs 32, 34 have the same pitch, height, and shape. The ribs 32, 34 are on opposite sides of an adhesive rubber layer 36 in which longitudinally extending, laterally spaced, load carrying cords 38 are embedded. One example of this type of double V-ribbed belt is shown in FIG. 4 of U.S. Pat. No. 2,728,239.

Use of a double V-ribbed belt, of the type as shown at 30 in FIG. 1, allows large forces to be transmitted through the belt 30. However, with this type of belt in the system described, a situation may occur wherein the belt, at the base of the ribs 32, 34 tears in a vertical direction. This tearing may be the result of foreign matter being in the grooves 40, 42 between adjacent ribs 32, 34, or a misalignment between the pulleys and belt 30.

Heretofore, no structure is known by the inventors for reinforcing the belt, of the type shown at 30 in FIG. 1, to prevent this tearing condition. Since the body of the belt between the bottoms of the grooves 40, 42 is relatively thin, it would be logical to thicken the adhesive rubber layer 36 to accommodate reinforcing members. However, the flexibility of the belt would be compromised by reason of the increased thickness of the adhesive rubber layer 36.

It is known to embed short, laterally extending fibers in both the inside and outside ribs on a double V-ribbed belt to effect reinforcement thereof. As shown in FIG. 4 of U.S. Pat. No. 2,728,239, short reinforcing fibers are mixed in the same concentration in both the inner and outer ribs. It has been found that with this type of double V-ribbed belt trained around a plurality of pulleys, as in the system shown in FIG. 2 herein, the wear resistance of the belt deteriorates significantly. Further, the flexibility of the belt is significantly diminished over that which it would be in the absence of the fibers.

This is particularly a problem on small diameter pulleys, such as those typically used for an engine alternator. One possible solution to this problem is to enlarge the diameter of the alternator pulleys so that the belt is not required to bend at such a severe angle. However, this is counterproductive, defeating the goal of reducing the overall size of the engine in the engine compartment.

SUMMARY OF THE INVENTION

In one form of the invention, a double V-ribbed belt is provided having a body with an inside, an outside, a length, and laterally spaced sides. At least a first rib is exposed on the inside of the body and extends in a lengthwise direction. At least a second rib is exposed on the outside of the body and extends in a lengthwise direction. A substantially inextensible layer resides between the first and second ribs. Laterally extending reinforcing fibers are provided in the body on at least one of the inside and outside of the inextensible layer, with the concentration of reinforcing fibers on the inside of the inextensible layer being different than the concentration of reinforcing fibers on the outside of the inextensible layer.

The inventors herein found, through extensive experimentation, that the advantages of the double V-ribbed belt could be exploited without the serious drawbacks discussed above. The inventors recognized that while the ribs on one side of the belt that rotate an alternator shaft in an automotive environment must have enhanced wear resistance, the ribs on the opposite side simply rotate one or two auxiliary units and are thus are not prone to wear. By having fewer fibers in the ribs on the opposite side of the belt, the flexibility of the belt is less adversely affected. As a consequence, high flexibility and good wear resistance can be realized.

In one form, there is a first plurality of reinforcing fibers embedded in the body on one of the inside and outside of the inextensible layer and a second plurality of reinforcing fibers embedded in the body on the other of the inside and outside of the inextensible layer, with the concentration of the first plurality of reinforcing fibers embedded in the body on the one of the inside and outside of the inextensible layer being different than the concentration of the second plurality of reinforcing fibers embedded in the body on the other of the inside and outside of the inextensible layer.

Preferably, the fibers in the first and second plurality of reinforcing fibers have a length that projects substantially in a lateral direction.

In one form, the first and second plurality of reinforcing fibers are embedded in rubber and the first plurality of reinforcing fibers is present in an amount of less than 5 parts by weight of fiber per 100 parts by weight of rubber, with the second plurality of reinforcing fibers being present in an amount of 5 to 25 parts by weight of fiber per 100 parts by weight of rubber.

More preferably, the first plurality of reinforcing fibers is present in an amount of 2 to 3 parts by weight of fiber per 100 parts by weight of rubber, with the second plurality of reinforcing fibers being present in an amount of 10 to 20 parts by weight of fiber per 100 parts by weight of rubber.

In one form, there is a plurality of laterally spaced ribs exposed on the inside of the body each extending in a lengthwise direction, with there being a second plurality of laterally spaced ribs exposed on the outside of the body each also extending in a lengthwise direction. The first plurality of reinforcing fibers is embedded in the first plurality of laterally spaced ribs, with the second plurality of reinforcing fibers embedded in the second plurality of laterally spaced ribs.

In one form, the substantially inextensible layer is made up of a plurality of load carrying cords extending in a lengthwise direction. The load carrying cords may be made up of at least one of polyester, polyamide, aramid, carbon, and glass fiber.

The load carrying cords may be embedded in rubber that is at least one of natural rubber (NR), styrene-butadiene rubber (SBR), chloroprene rubber (CR), nitrile rubber (NBR), hydrogenated nitrile rubber (HNBR), chlorosulphonated polyethylene rubber (CSM), and polyurethane.

In one form, the fibers in the first and second plurality of reinforcing fibers have a length that is substantially less than the distance between the laterally spaced sides of the body. In a more preferred form, the reinforcing fibers have a length of 3–10 mm.

The reinforcing fibers in the first and second plurality of reinforcing fibers may be at least one of a) synthetic fiber that is at least one of nylon, vinylon, polyester, and aromatic polyamide, and b) natural fiber that is at least one of cotton and pulp.

In another form of the invention, the reinforcing fibers are each monofilaments, each having an elongate body that is oblate, as viewed in cross section taken transversely to the length of the reinforcing fibers, so as to define a major axis and a minor axis.

The minor axis preferably extends in a direction between the inside and outside of the body.

The minor axis is preferably no more than 0.8 mm, with the ratio of the major axis to the minor axis being 1.5–10.

Through extensive experimentation and testing, the inventors herein also found that tearing of a double V-ribbed belt could be avoided by the inclusion of the monofilament fibers. Monofilaments are added without increasing the thickness of the belt to the point that its flexibility is undesirably compromised.

In one form, the monofilament reinforcing fibers are embedded in the rubber in the substantially inextensible layer and do not reside in either of the first and second ribs.

The monofilament reinforcing fibers may all reside at substantially the same distance from the load carrying cords, and adjacent to the load carrying cords.

The monofilaments may be made from at least one of nylon, polyester, and aramid.

The monofilament fibers can be provided in combination with a second type of reinforcing fibers, each having an elongate body that is non-oblate, as viewed in cross section taken transversely to the length of the second type of reinforcing fibers, with the second type of reinforcing fibers being embedded in at least one of the first and second ribs. In another form, the second type of reinforcing fibers are embedded in each of the first and second ribs.

In another form of the invention, a V-ribbed belt is provided having a body with an inside and outside, a length, and laterally spaced sides. At least a first rib is exposed on the inside of the body and extends in a lengthwise direction. A substantially inextensive layer is provided on the body and is made up of a plurality of laterally extending load carrying cords embedded in rubber to extend in a lengthwise direction. Laterally extending reinforcing fibers are provided in the body, which fibers each have an elongate body that is oblate as viewed in cross section taken transversely to the length of the reinforcing fibers, with a major and a minor axis. The reinforcing fibers reside adjacent to the load carrying cords, with the minor axis extending in a direction between the inside and outside of the body.

DETAILED DESCRIPTION OF THE DRAWINGS

Figure 3:
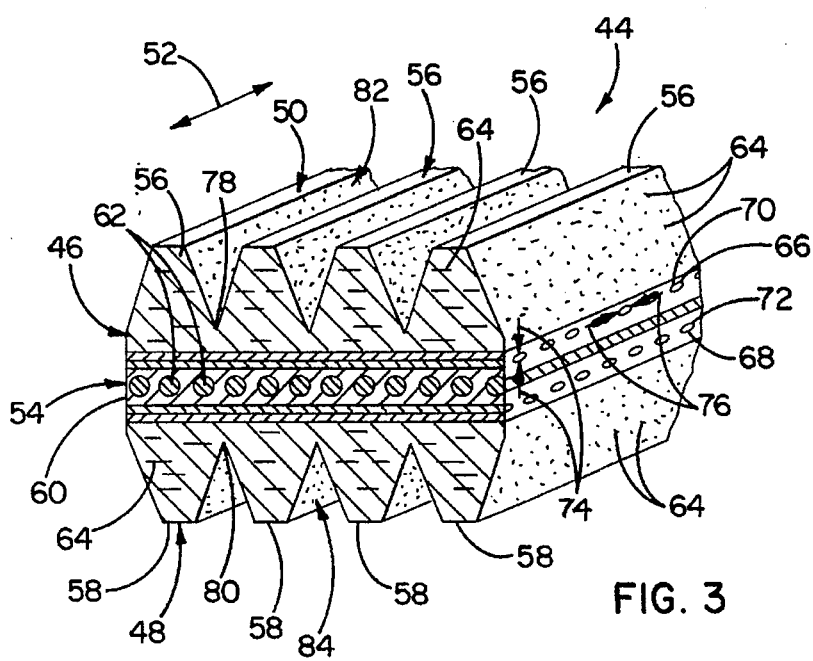
FIG. 3 is a fragmentary, perspective view of a double V-ribbed belt made according to the present invention.

In FIG. 3, one form of double V-ribbed belt, according to the present invention, is shown at 44. The belt 44 has a body 46 with an inside 48, an outside 50, and a length extending in the direction of the double-headed arrow 52. The body 46 has a substantially inextensible layer 54, with there being a plurality of laterally spaced, longitudinally extending, V-shaped ribs 56 on the outside thereof, and a like plurality of laterally spaced, longitudinally extending, V-shaped ribs 58 on the inside thereof. The ribs 56, 58 are configured to cooperate with a pulley (not shown) having ribs and projections shaped to be complementary to the ribs 56, 58.

The inextensible layer 54 is defined by a cushion rubber layer 60 in which laterally spaced, longitudinally extending, load carrying cords 62 are embedded. The load carrying cords 62 have good resistance to elongation and high strength. The cords 62 are preferably made of at least one of polyester, polyamide, aramid, carbon, or glass fiber.

The cushion rubber layer 60, within which the load carrying cords 62 are embedded, is preferably made from natural rubber (NR), styrene-butadiene rubber (SBR), chloroprene rubber (CR), nitrile rubber (NBR), hydrogenated nitrile rubber (HNBR), chlorosulphonated polyethylene rubber (CSM), polyethylene, or the like. The cushion rubber layer 60 could be made from any of the above rubbers or a blend thereof.

In a preferred form, the ribs 56, 58 are made from a rubber-like elastic material, and preferably from the same material as that defining the cushion rubber layer 60.

Short reinforcing fibers 64 are embedded in each of the ribs 56, 58 exposed at the outside and inside of the belt 44. These fibers 64 may be a) synthetic fibers, such as nylon, vinylon, polyester, aromatic polyamide, or the like, b) natural fiber, such as cotton or pulp, or c) a mixture of filaments of natural fiber and synthetic fiber at predetermined relative proportions. The fibers 64, to include the mixed filaments, preferably have a length of 3-10 mm with the lengths oriented to extend in a lateral direction. Preferably, the fibers 64 are mixed at a concentration of 5-30 parts by weight of fiber per 100 parts by weight of rubber.

The fibers 64 are not required, and while shown in equal concentrations in each of the ribs 56, 58, are more preferably present in a higher concentration in the ribs 58 than in the ribs 56, as shown in the belt 96 and described below.

Monofilament fibers 66, 68 are also embedded in the belt body 46 at locations, outside and inside, respectively, of the load carrying cords 62. The monofilament fibers 66, 68 have a length with an oblate shape as viewed in cross section taken transversely to the length thereof. The monofilament fibers 66 are embedded in a substantially parallel arrangement, are equidistantly spaced outside of the load carrying cords 62, and are located in the cushion rubber layer 60 between the load carrying cords 62 and the ribs 56. The monofilament fibers 68 are similarly arranged beneath the load carrying cords 62 to reside in the cushion rubber layer 60 between the load carrying cords 62 and the ribs 58. The fibers 66, 68 can be fully surrounded by the rubber in the cushion rubber layer 60 so that the adhesion of the various components is not diminished appreciably.

Each of the monofilament fibers 66, 68 has a body, 70, 72 respectively, that is elongate, with the length thereof extending laterally with respect to the belt body 46.

The cross section of each body 70, 72 has a minor axis extending in a direction between the inside and outside of the belt body 46, as indicated by the arrows 74, and a major axis, extending in a lengthwise direction, as indicated by the arrows 76. In a preferred form, the ratio of the major axis to the minor axis is 1.5 to 10, with the length of the minor axis being preferably no more than 0.8 mm.

Preferably, the monofilament fibers 66, 68 are made from synthetic fiber material, such as nylon, polyester, vinylon, aramid, or the like. The monofilament fibers 66, 68 can be a mixture of these fibers.

The laterally extending, monofilament fibers 66, 68, prevent tearing of the body 46 where it is the thinnest at the base portions 78, 80 of the grooves 82, 84 between adjacent ribs 56, 58, respectively. Because the monofilament fibers 66, 68 have a relatively small dimension (i.e. minor axis) between the inside and outside of the belt body 46, they can be contained within the cushion rubber layer 60 in a relatively small space between the load carrying cords 62 and the ribs 56 the outside side of the belt, and the load carrying cords 62 and the ribs 58 on the inside of the belt. Belt flexibility is thus maintained, thereby avoiding separation of belt components as when the belt is sharply bent.

It has been found that if the ratio of the major to minor axis is less than 1.5, the length of the minor axis, i.e. the dimension of the monofilament fibers 66, 68 in the direction between the inside and outside of the belt, is 0.8 mm or greater. This results in a thickening of the cushion rubber layer 60, which in turn results in the overall belt being thickened to the point that the flexibility of the belt is undesirably diminished.

If the ratio of major to minor axis is greater than 10, the monofilament fibers 66, 68 are excessively oblate, with the result being that the longitudinal spacing between the monofilament fibers 66, 68 is diminished. As a result, the belt body 46 cannot be easily bent. This negates the positive effects realized from keeping the belt thickness at a minimum, with the result being that the life of the belt is not appreciably lengthened, if at all.

Figure 4:
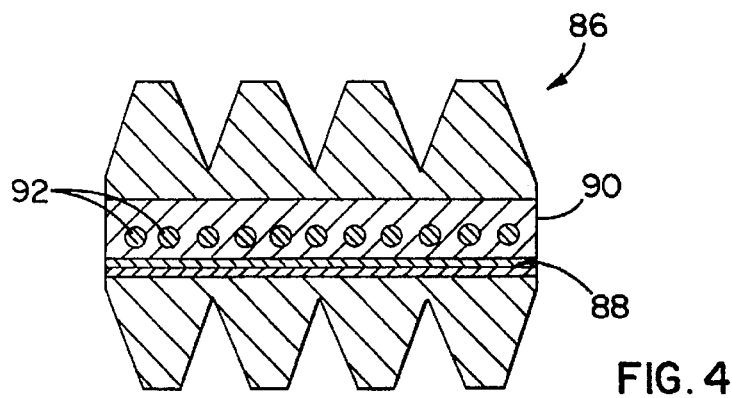
FIG. 4 is a cross-sectional view of a modified form of double V-ribbed belt made according to the present invention.

In FIG. 4, a modified form of belt, according to the present invention, is shown at 86. The belt 86 is similar in construction to the belt 44, with the primary distinction being that monofilament fibers 88, corresponding to those 66, 68 in FIG. 3, are provided in a corresponding cushion rubber layer 90 on only one side of load carrying cords 92 embedded in the cushion rubber layer 90. The monofilament fibers 88 could be on either side of the load carrying cords 92 so as to be in either that portion of the belt that is in tension or that portion that is in compression.

Figure 5:
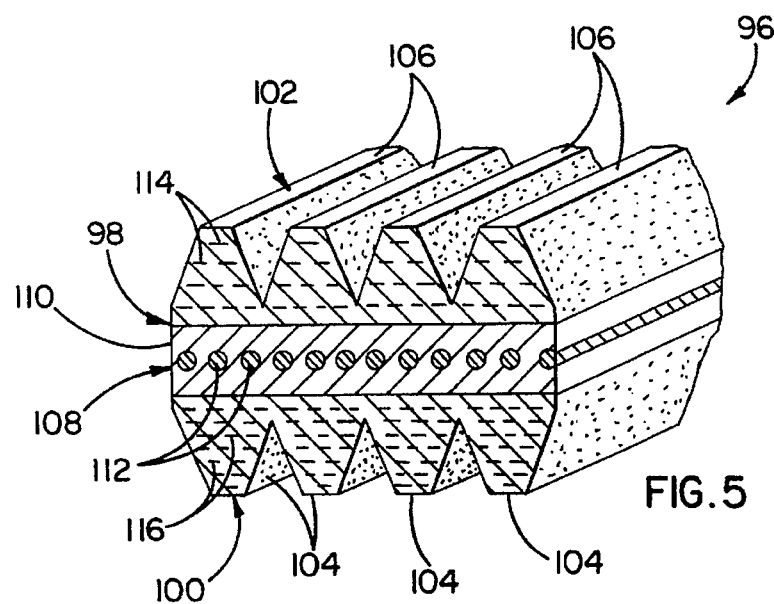
FIG. 5 is a fragmentary, perspective view of a further modified form of double V-ribbed belt, according to the present invention.

In FIG. 5, a further modified form of belt, according to the present invention, is shown at 96 in FIG. 5. The belt 96 is a double V-ribbed belt as the belts 44, 86 in FIGS. 3 and 4, respectively, and has a body 98 with an inside 100 and an outside 102. Laterally spaced, longitudinally extending ribs 104 are exposed on the inside of the belt body 98, with corresponding ribs 106 exposed on the outside of the body 98. An inextensible layer 108 resides between the ribs 104, 106 and includes a cushion rubber 110 in which load carrying cords 112 are embedded.

In a preferred composition for the ribs 104, 106, the cushion rubber 110 and load carrying cords 112 is the same as that previously described for the belt 44 in FIG. 3.

A plurality of fibers 114 is embedded in the belt body 98 on the outside of the inextensible layer 108, with a plurality of fibers 116 being similarly embedded in the belt body 98 on the inside of the inextensible layer 108. The fibers 114, 116 preferably have a length of 3-10 mm and are oriented so that their lengths extend in a lateral direction within the belt body 98.

Preferably, the fibers 114, 116 are a) synthetic fibers, such as nylon, vinylon, polyester, or aromatic polyamide, b) natural fibers, such as cotton or pulp, or c) filaments that are a mixture of natural fibers and synthetic fibers.

According to the invention, the concentration of fibers 114 in the ribs 106 is different than the concentration of the fibers 116 in the ribs 104. The concentration of the fibers 116 in the ribs 104 is greater to improve wear resistance, with the concentration of fibers 114 in the ribs 106 being less to give more flexibility.

More particularly, the concentration of fibers 116 in the ribs 104 is 5-25 parts by weight of fiber, and more preferably 10-20 parts by weight of fiber, per 100 parts by weight of rubber. The fibers 114 in the ribs 106 are present in an amount of less than 5 parts by weight, and more preferably 2–3 parts by weight of fiber, per 100 parts by weight of rubber.

It has been found if the concentration of fibers 116 in the ribs 104 is less than 5 parts by weight per 100 parts by weight of rubber, wear resistance is unsatisfactory. If the fiber content exceeds 25 parts by weight, the resistance to bending deteriorates to the point that the belt is not effectively useable in a multi-shaft drive system.

Figure 1:
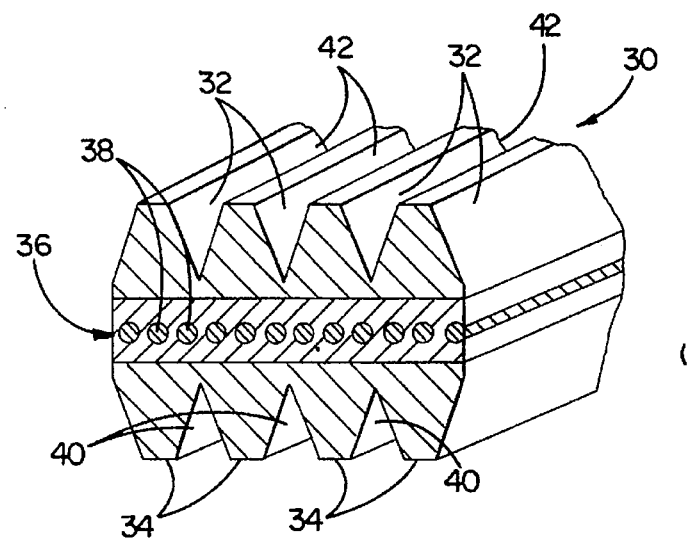
FIG. 1 is a fragmentary, perspective view of a conventional double V-ribbed belt.
Figure 2:
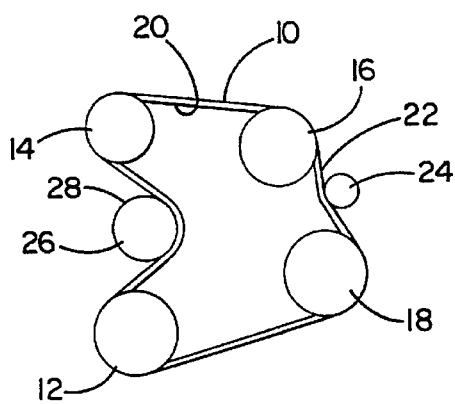
FIG. 2 is a schematic representation of a conventional automotive system on which the belt in FIG. 1 is incorporated.

If the quantity of fibers 114 in the ribs 106 is greater than 5 parts by weight per 100 parts by weight of rubber, and the belt is bent inversely on a pulley, such as on an alternator pulley having a small diameter, the resistance to bending deteriorates so that the life of the belt may be relatively short. The performance of the inventive belt was tested against other belts. In one test, the belt as shown at 44 in FIG. 3 (with the monofilament fibers 66 and without the monofilament fibers 68) was compared to a belt as shown at 30 in FIG. 1 to determine the relative resistance to longitudinal tearing.

Both test belts 30 and 44 were double V-ribbed belts each having four K-shaped ribs on the upper and lower surfaces thereof. In the inventive belt 44, monofilament fibers 66 with an oblate cross section, were embedded, with the fibers 66 having a major axis of 1.65 mm and a minor axis of 0.22 mm. The ratio of the major axis to the minor axis was 7.5. The monofilament fibers 66 were embedded in parallel outside of the load carrying cords 62, with the minor axis extending in a direction between the inside and outside of the belt.

Two ribs on each of the belts 30, 44 were engaged by chucks, to be pulled by a conventional tension tester at a tensile speed of 50 mm per minute from two spaced positions with respect to the bottom of the rib grooves to compare the longitudinal tearing forces.

The inventive belt 44 was torn with a force of 145 to 153N (Newtons), with the non-inventive belt tearing at a force of 52–62N. The tearing force for the inventive belt 44 was approximately 2.6 times that of the conventional belt 30.

The inventive belt 96 was also tested side-by-side with a conventional type belt to compare a) wear due to slippage during running, and b) running life. In this testing, a 3 PK1100 double V-ribbed belt 96 was used with the ribs 104, 106 having embedded therein aramid fibers in a concentration of 2 parts by weight of fiber 114 in the ribs 106 and 15 parts by weight of fiber 116 per 100 parts by weight of rubber in the ribs 104.

The conventional belt was a double V-ribbed belt having inner and outer ribs, with there being short fibers of the same type embedded in the inside and outside ribs in an amount of 15 parts by weight of fiber per 100 parts by weight of rubber.

Figure 6:
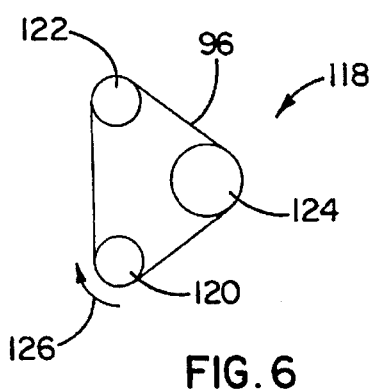
FIG. 6 is a schematic representation of a system for dynamically testing forced, slip wear resistance for a double V-ribbed belt.

The forced slip wear test was performed on a test system as shown at 118 in FIG. 6. The inventive belt 96 and the comparative belt were trained around a drive pulley 120, a follower pulley 122 and a tensioning pulley 124. The drive and follower pulleys 120, 122 each had an 80 mm diameter, with the tensioning pulley 124 having a diameter of 120 mm.

A portion of the belt between the drive pulley 120 and follower pulley 122 was forced to slip. The load on the follower pulley 122 was 1 kgm (9.8 Nm). The drive pulley 120 was rotated in the direction of the arrow 126 for 24 hours at a rotational speed of 3,000 rpm at room temperature.

The amount of wear on each belt was measured. It was determined that the amount of wear of the inventive belt 96 was 0.36 g, substantially the same as that for the conventional belt tested.

Figure 7:
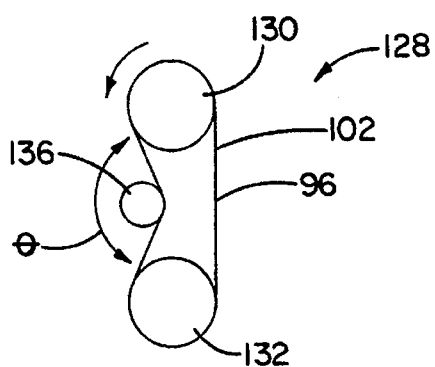
FIG. 7 is a schematic representation of a system for dynamically testing the life of a double V-ribbed belt.

A durability test was also performed on a test setup as shown at 128 in FIG. 7. The same two belts 96 were trained around a drive pulley 130, having a 120 mm diameter, and a follower pulley 132 also having a 120 diameter. A force was applied to the outside 102 of the belt 96 through an idler pulley 136 pressed against the belt 96 so that a tension of 60 kgf/3PK was developed on the belt 96. This resulted in a wrap angle (θ) of 120°. The drive pulley 130 was rotated at a speed of 3600 rpm.

The inventive belt had a life of 902 hours. The conventional belt had a life of 337 hours. Accordingly, the inventive belt had a life of 2.7 times that of the conventional belt.

The foregoing disclosure of specific embodiments is intended to be illustrative of the broad concepts comprehended by the invention.

We claim:

1. A double V-ribbed belt comprising:

a body with an inside, an outside, a length, and laterally spaced sides;

at least a first rib exposed on the inside of the body and extending in a lengthwise direction;

at least a second rib exposed on the outside of the body and extending in a lengthwise direction;

a substantially inextensible layer between the first and second ribs; and laterally extending reinforcing fibers in the body on at least one of the inside and outside of the inextensible layer, wherein the concentration of reinforcing fibers on the inside of the inextensible layer is different than the concentration of reinforcing fibers on the outside of the inextensible layer.

2. The double V-ribbed belt according to claim 1 wherein there is a first plurality of reinforcing fibers embedded in the body on one of the inside and outside of the inextensible layer and a second plurality of reinforcing fibers embedded in the body on the other of the inside and outside of the inextensible layer, wherein the concentration of the first plurality of reinforcing fibers embedded in the body on the one of the inside and outside of the inextensible layer is different than the concentration of the second plurality of reinforcing fibers embedded in the body on the other of the inside and outside of the inextensible layer.

3. The double V-ribbed belt according to claim 2 wherein the fibers in the first and second plurality of reinforcing fibers each have a length that projects substantially in a lateral direction.

4. The double V-ribbed belt according to claim 2 wherein the first and second plurality of reinforcing fibers are embedded in rubber and the first plurality of reinforcing fibers is present in an amount of less than 5 parts by weight of fiber is per 100 parts by weight of rubber and the second plurality of reinforcing fibers present in an amount of 5–25 parts by weight of fiber per 100 parts by weight of rubber.

5. The double V-ribbed belt according to claim 4 wherein there is a first plurality of laterally spaced ribs exposed on the inside of the body each extending in a lengthwise direction, there is a second plurality of laterally spaced ribs exposed on the outside of the body each extending in a lengthwise direction, the first plurality of reinforcing fibers is embedded in the first plurality of laterally spaced ribs and the second plurality of reinforcing fibers is embedded in the second plurality of laterally spaced ribs.

6. The double V-ribbed belt according to claim 1 wherein the substantially inextensible layer comprises a plurality of load carrying cords extending lengthwise of the body.

7. The double V-ribbed belt according to claim 6 wherein the load carrying cords comprise at least one of polyester, polyamide, aramid, carbon, and glass fiber.

8. The double V-ribbed belt according to claim 7 wherein the substantially inextensible layer comprises rubber in which the load carrying cords are embedded and the rubber in which the load carrying cords are embedded comprises at least one of natural rubber (NR), styrene-butadiene rubber (SBR), chloroprene rubber (CR), nitrile rubber (NBR), hydrogenated nitrile rubber (HNBR), chlorosulphonated polyethylene rubber (CSM), and polyurethane.

9. The double V-ribbed belt according to claim 2 wherein the reinforcing fibers in the first and second plurality of reinforcing fibers have a length that is substantially less than the distance between the laterally spaced sides of the body.

10. The double V-ribbed belt according to claim 9 wherein the reinforcing fibers in the first and second plurality of reinforcing fibers have a length of 3–10 mm.

11. The double V-ribbed belt according to claim 10 wherein the reinforcing fibers in the first and second plurality of reinforcing fibers comprise at least one of a) synthetic fibers that are at least one of nylon, vinylon, polyester and aromatic polyamide and b) natural fibers that are at least one of cotton and pulp.

12. The double V-ribbed belt according to claim 4 wherein the first plurality of reinforcing fibers is present in an amount of 2–3 parts by weight of fiber per 100 parts by weight of rubber.

13. The double V-ribbed belt according to claim 4 wherein the second plurality of reinforcing fibers is present in an amount of 10–20 parts by weight of fiber per 100 parts by weight of rubber.

14. The double V-ribbed belt according to claim 1 wherein the reinforcing fibers each comprise a monofilament.

15. The double V-ribbed belt according to claim 14 wherein the reinforcing fibers each have an elongate body that is oblate as viewed in cross section taken transversely to the length of the reinforcing fibers with a major axis and a minor axis.

16. The double V-ribbed belt according to claim 15 wherein the minor axis extends in a direction between the inside and outside of the body.

17. The double V-ribbed belt according to claim 15 wherein the ratio of the major axis to the minor axis is 1.5 to 10.

18. The double V-ribbed belt according to claim 15 wherein the minor axis is no more than 0.8 mm.

19. The double V-ribbed belt according to claim 15 wherein the substantially inextensible layer comprises rubber in which a plurality of laterally spaced load carrying cords is embedded so that the load carrying cords extend in a lengthwise direction, said reinforcing fibers being embedded in the rubber in the substantially inextensible layer.

20. The double V-ribbed belt according to claim 19 wherein the reinforcing fibers do not reside in either of the first and second ribs.

21. The double V-ribbed belt according to claim 15 wherein the monofilaments comprise at least one of nylon, polyester, and aramid.

22. The double V-ribbed belt according to claim 19 wherein the reinforcing fibers all reside at substantially the same distance from the load carrying cords.

23. The double V-ribbed belt according to claim 22 wherein the reinforcing fibers all reside adjacent to the load carrying cords.

24. The double V-ribbed belt according to claim 15 wherein there are a plurality of a second type of reinforcing fibers each having an elongate body that is non-oblate as viewed in cross section taken transversely to the length of the second type of reinforcing fibers, said second type of reinforcing fibers being embedded in at least one of the first and second ribs.

25. The double V-ribbed belt according to claim 24 wherein a plurality of the second type of reinforcing fibers is embedded in each of the first and second ribs.

26. A V-ribbed belt comprising:

a body with an inside, an outside, a length, and laterally spaced sides;

at least a first rib exposed on the inside of the body and extending in a lengthwise direction;

a substantially inextensible layer on the body, said inextensible layer comprising rubber in which a plurality of laterally spaced load carrying cords are embedded to extend in a lengthwise direction; and laterally extending reinforcing fibers in the body, said reinforcing fibers each having an elongate body that is oblate as viewed in cross section taken transversely to the length of the reinforcing fibers with a major axis and a minor axis, wherein the reinforcing fibers reside adjacent to the load carrying cords and the minor axis extends in a direction between the inside and outside of the body.

27. The V-ribbed belt according to claim 26 wherein the reinforcing fibers reside in the rubber in the inextensible layer in which the load carrying cords are embedded.

28. The V-ribbed belt according to claim 27 wherein the reinforcing fibers do not extend into the first rib.

29. The V-ribbed belt according to claim 28 wherein there is a plurality of a second type of fiber embedded in the first rib.

30. The V-ribbed belt according to claim 26 wherein the V-ribbed belt comprises at least a second rib laterally spaced from the first rib and exposed on the inside of the body and third and fourth laterally spaced ribs extending in a lengthwise direction and exposed on the outside of the body.

31. The V-ribbed belt according to claim 30 wherein there is a plurality of the reinforcing fibers residing on both the inside and outside of the load carrying cords.

32. The V-ribbed belt according to claim 31 wherein the reinforcing fibers do not reside in any of the first, second, third and fourth ribs.

33. The V-ribbed belt according to claim 32 wherein the ratio of the major axis to the minor axis is 1.5 to 10.

34. The V-ribbed belt according to claim 33 wherein the minor axis is no more than 0.8 mm.

35. The V-ribbed belt according to claim 34 wherein the reinforcing fibers comprise monofilaments that are at least one of nylon, polyester, and aramid.

36. The V-ribbed belt according to claim 26 wherein the reinforcing fibers have a length that is oriented in a lateral direction.

* * * * *